US012739415B2

(12) United States Patent
Lee et al.

(10) Patent No.: US 12,739,415 B2
(45) Date of Patent: Sep. 15, 2026

(54) IMAGE PROCESSING DEVICE, MOBILE DEVICE, AND METHOD OF OPERATING THE SAME

(71) Applicant: SAMSUNG ELECTRONICS CO., LTD., Suwon-si (KR)

(72) Inventors: Wonseok Lee, Suwon-si (KR); Kyungil Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/392,570

(22) Filed: Dec. 21, 2023

(65) Prior Publication Data

US 2024/0214593 A1 Jun. 27, 2024

(30) Foreign Application Priority Data

Dec. 26, 2022 (KR) ........................ 10-2022-0184943
May 11, 2023 (KR) ........................ 10-2023-0061259

(51) Int. Cl.
*H04N 19/176* (2014.01)
*H04N 19/105* (2014.01)
*H04N 19/182* (2014.01)
*H04N 19/433* (2014.01)

(52) U.S. Cl.
CPC ......... *H04N 19/433* (2014.11); *H04N 19/182* (2014.11)

(58) Field of Classification Search
None
See application file for complete search history.

(56) References Cited

U.S. PATENT DOCUMENTS

| | | | |
|---|---|---|---|
| 4,405,080 | A | 9/1983 | Kompelien |
| 6,192,073 | B1 | 2/2001 | Reader et al. |
| 7,221,483 | B2 | 5/2007 | Yagishita et al. |
| 7,716,551 | B2 | 5/2010 | Barkley et al. |
| 8,306,340 | B2 | 11/2012 | Ceperkovic et al. |
| 8,588,545 | B2 | 11/2013 | Wedi et al. |
| 9,420,279 | B2 | 8/2016 | Jang et al. |
| 10,178,390 | B2 | 1/2019 | Lee |
| 10,979,702 | B2 | 4/2021 | Kouno |
| 11,025,952 | B2 | 6/2021 | Lv et al. |
| 11,064,198 | B2 | 7/2021 | Okawa |

(Continued)

FOREIGN PATENT DOCUMENTS

| | | | |
|---|---|---|---|
| JP | 3333336 | B2 | 10/2002 |
| JP | 5272940 | B2 | 8/2013 |
| KR | 10-1168007 | B1 | 7/2012 |

*Primary Examiner* — Samuel D Fereja
(74) *Attorney, Agent, or Firm* — Sughrue Mion, PLLC

(57) ABSTRACT

An image processing device includes an encoder and a decoder. The encoder compresses image data including pixel values of a pixel group in units of pixel groups to generate a bitstream and decompresses the bitstream to generate first restored data. The decoder receives the bitstream from the encoder and decompresses the bitstream to generate second restored data. The encoder includes a first statistic circuit that generates first statistical data based on the first restored data and changes a setting value of the encoder based on the first statistical data, and the decoder includes a second statistic circuit that generates second statistical data based on the second restored data and changes a setting value of the decoder based on the second statistical data.

15 Claims, 13 Drawing Sheets

(56) References Cited

U.S. PATENT DOCUMENTS

| | | | | |
|---|---|---|---|---|
| 11,206,401 | B2 | 12/2021 | Kim et al. | |
| 11,425,404 | B2 | 8/2022 | Kuusela et al. | |
| 2010/0067574 | A1* | 3/2010 | Knicker | G06T 5/73 375/E7.246 |
| 2010/0220936 | A1* | 9/2010 | Yamaguchi | H04N 19/103 382/238 |
| 2017/0019685 | A1* | 1/2017 | Morigami | H04N 19/117 |
| 2019/0028722 | A1* | 1/2019 | Choi | G06T 3/4015 |
| 2021/0344869 | A1 | 11/2021 | Lee et al. | |
| 2021/0406381 | A1* | 12/2021 | Heisrath | H04L 63/123 |

* cited by examiner

Figure 1:
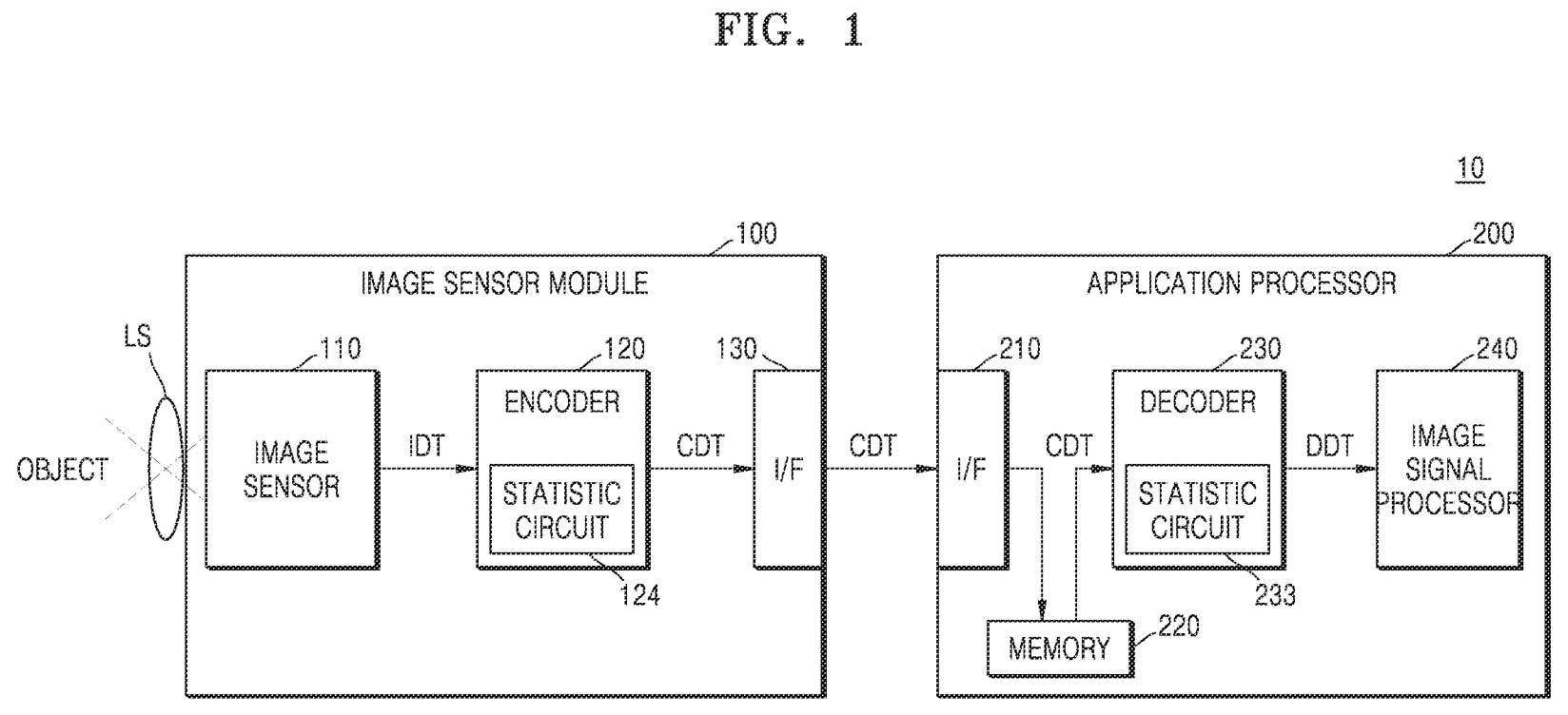

OBJECT
LS
100
IMAGE SENSOR MODULE
110
IMAGE SENSOR
IDT
120
ENCODER
STATISTIC CIRCUIT
124
CDT
130
I/F
CDT
200
APPLICATION PROCESSOR
210
I/F
CDT
220
MEMORY
230
DECODER
STATISTIC CIRCUIT
233
DDT
240
IMAGE SIGNAL PROCESSOR

FIG. 5

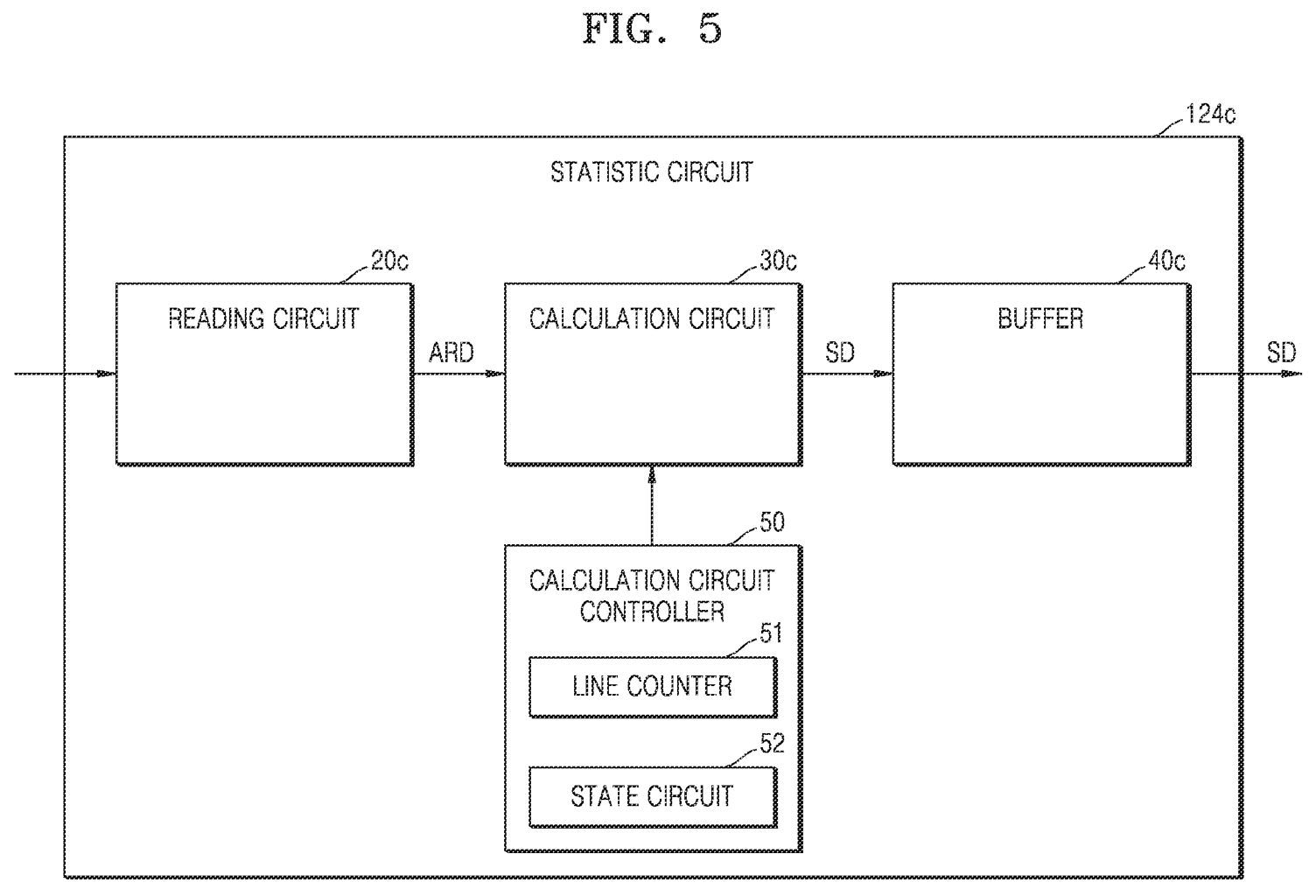

124c
STATISTIC CIRCUIT
20c
READING CIRCUIT
ARD
30c
CALCULATION CIRCUIT
SD
40c
BUFFER
SD
50
CALCULATION CIRCUIT CONTROLLER
51
LINE COUNTER
52
STATE CIRCUIT 10a
120c
ENCODER
CDT
IDT
122c
COMPRESSOR
121c
REFERENCE PIXEL DETECTOR
123c
RECONSTRUCTION IMAGE GENERATOR
RD
124d
STATISTIC CIRCUIT
SD
125
APB INTERFACE
CP1
150
FIRMWARE

IMAGE PROCESSING DEVICE, MOBILE DEVICE, AND METHOD OF OPERATING THE SAME

CROSS-REFERENCE TO RELATED APPLICATIONS

This application is based on and claims priority under 35 U.S.C. § 119 to Korean Patent Application Nos. 10-2022-0184943, filed on Dec. 26, 2022, and 10-2023-0061259, filed on May 11, 2023, in the Korean Intellectual Property Office, the disclosures of each of which being incorporated by reference herein in their entirety.

BACKGROUND

The present disclosure relates to an image processing device, and more particularly, to an image processing device for synchronizing setting values of an encoder with setting values of a decoder in real time, an electronic device, and a method of operating the same.

Recently, as demands for high-quality and high-definition photos and videos have increased, the number of sensing pixels in a pixel array of an image sensor have increased, and thus, the size of image data generated by the image sensor has increased. Thus, image data may be compressed to increase transmission efficiency, the image data may be transmitted to an image processing device, and compressed image data may be decompressed to increase image data transmission efficiency.

When setting values used for compression are different from setting values used for decompression, a normal image may not be output and a visual error may occur.

SUMMARY

It is an aspect to provide an image processing device for synchronizing setting values of an encoder with setting values of a decoder in real time, an electronic device, and a method of operating the same.

According to an aspect of one or more embodiments, there is provided an image processing device comprising an encoder configured to compress image data including pixel values of a pixel group in units of pixel groups to generate a bitstream and to decompress the bitstream to generate first restored data; and a decoder configured to receive the bitstream from the encoder and decompress the bitstream to generate second restored data. The encoder comprises a first statistic circuit configured to generate first statistical data based on the first restored data and change a setting value of the encoder based on the first statistical data, and the decoder comprises a second statistic circuit configured to generate second statistical data based on the second restored data and change a setting value of the decoder based on the second statistical data.

According to another aspect of one or more embodiments, there is provided a method of operating an image processing device that synchronizes an encoder and a decoder each having a statistic circuit, the method comprising generating, by the statistic circuit in each of the encoder and the decoder, corresponding statistical data by performing a same arithmetic operation based on corresponding restored data; and simultaneously updating a setting value of the encoder and a setting value of the decoder based on the corresponding statistical data.

According to another aspect of one or more embodiments, there is provided an electronic device comprising an image sensor comprising a pixel array, the image sensor configured to output image data; an image signal processor comprising an encoder configured to compress the image data to generate a bitstream and to decompress the bitstream to generate first restored data; and an application processor comprising a decoder configured to receive the bitstream from the encoder and decompress the bitstream to generate second restored data, wherein the encoder comprises a first statistic circuit configured to generate first statistical data by performing an arithmetic operation based on the first restored data, and the decoder comprises a second statistic circuit configured to generate second statistical data by performing the arithmetic operation based on the second restored data.

BRIEF DESCRIPTION OF THE DRAWINGS

Various embodiments will be more clearly understood from the following detailed description taken in conjunction with the accompanying drawings, in which:

FIG. 1 is a block diagram showing an image processing device according to an embodiment;

FIG. 5 is a block diagram showing a statistic circuit according to an embodiment;

DETAILED DESCRIPTION

Figure 2:
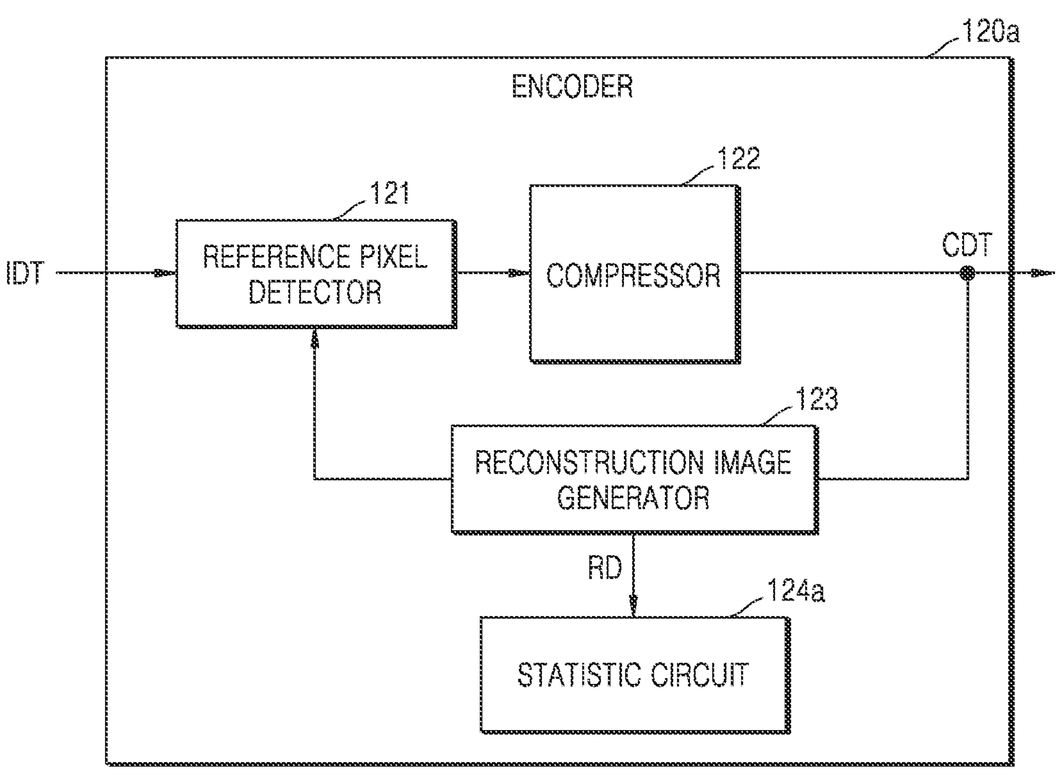
FIG. 2 is a block diagram showing an encoder including a statistic circuit according to an embodiment.

An image processing device may include an encoder that performs a compression operation and a decoder that performs a decompression operation, and various setting values of the encoder may be changed and various setting values of the decoder may be changed to achieve image quality improvement, function change, etc. in image processing. When setting values of the encoder and setting values of the decoder are different, a normal image may not be output and a visual error may occur, and thus, a method of synchronizing settings of the encoder and decoder in real time is demanded.

FIG. 1 is a block diagram showing an image processing device according to an embodiment. An image processing device 10 may sense an image regarding a target object, process a sensed image, and store a sensed image in a memory or store a processed image in the memory. According to an embodiment, the image processing device 10 may be implemented as a digital camera, a digital camcorder, a mobile phone, a tablet personal computer (PC), or a portable electronic device. The portable electronic device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. According to an embodiment, the image processing device 10 may be installed as a part on a drone, an advanced drivers assistance system (ADAS), or an electronic device provided as a component of a vehicle, furniture, a manufacturing facility, a door, and various measuring devices.

Referring to FIG. 1, the image processing device 10 may include an image sensor module 100 and an application processor 200. The image sensor module 100 may include an image sensor 110, an encoder 120, and an interface (I/F) 130. According to an embodiment, the image sensor module 100 may be implemented by a plurality of semiconductor chips. For example, in some embodiments, a pixel array of the image sensor 110 may be integrated into one semiconductor chip; a logic circuit, the encoder 120, and the interface (I/F) 130 of the image sensor 110 may be integrated into another semiconductor chip; and the plurality of semiconductor chips may be electrically connected to each other through a connection member or may be stacked and electrically connected to each other through vias. However, embodiments are not limited thereto, and the image sensor module 100 may also be implemented in its entirety by one semiconductor chip.

The image sensor module 100 may photograph an outside target object (or object) and generate image data IDT. The image sensor module 100 may include the image sensor 110 capable of converting optical signals of a target object incident through a lens LS into electric signals.

The image sensor 110 may include a pixel array in which a plurality of sensing pixels are 2-dimensionally arranged and may output the image data IDT including a plurality of pixel values of the pixel array.

According to some embodiments, pixels of the pixel array may each sense a light signal of at least one color from among a plurality of reference colors. For example, the reference colors may include red, green, and blue, may include red, green, blue, and white, or may include other colors. For example, the reference colors may include cyan, yellow, green, and magenta. The pixel array may generate pixel signals including information regarding reference colors of the respective sensing pixels.

The image data IDT may be generated based on pixel signals output from the pixel array. According to some embodiments, the image data IDT may have a color pattern corresponding to a pixel pattern of the pixel array. For example, when the pixel array has a Bayer pattern, the image data IDT may include pixel values according to the Bayer pattern. Alternatively, for example, when the pixel array has a tetra pattern, the image data IDT may include pixel values according to the tetra pattern or the Bayer pattern.

The image sensor module 100 may compress the image data IDT by using the encoder 120 to generate compressed data CDT and transmit the compressed data CDT to the application processor 200 to increase data transmission speed, reduce power consumption according to data transmission, and improve data storage efficiency.

The encoder 120 may receive the image data IDT from the image sensor 110 and compress the image data IDT to generate the compressed data CDT. The compressed data CDT may be implemented in the form of an encoded bitstream. Hereinafter, the encoded bitstream is simply referred to as a bitstream. The bitstream may include a compression result and compression information (e.g., mode information indicating a compression scheme).

The encoder 120 may generate the compressed data CDT by encoding the image data IDT in units of pixel groups. According to some embodiments, the encoder 120 may generate one bitstream by encoding the image data IDT corresponding to one pixel group and generate the compressed data CDT based on bitstreams generated by encoding the image data IDT corresponding to all pixel groups in the image data IDT. Since the image data IDT is encoded in units of pixel groups, encoding may be used in the same sense as compression in the inventive concept.

The encoder 120 may perform compression by using a reference map generated based on pixel values corresponding to a pixel group that was previously compressed to a pixel group to be compressed (i.e., a target pixel group). According to some embodiments, the encoder 120 may compress a pixel value of at least one target pixel based on a reference value of at least one reference pixel adjacent to the at least one target pixel in the target pixel group in the reference map. A reference value is generated based on the pixel value of a reference pixel. For example, the reference value may be a value generated as the pixel value of the reference pixel is compressed and then decompressed.

The encoder 120 may include a statistic circuit 124. The statistic circuit 124 may generate statistical data by performing an arithmetic operation based on restored data generated in an encoding process. According to some embodiments, the restored data may include pixel values having reference values. For example, the restored data may be data obtained by decompressing pixel values of a pixel group that was compressed prior to a target pixel group. Some embodiments in which the statistic circuit 124 generates statistical data by performing an arithmetic operation based on restored data are described below with reference to FIG. 3.

The encoder 120 may generate configuration parameters by performing an arithmetic operation based on the statistical data generated by the statistic circuit 124 and may change setting values of the encoder 120 based on the configuration parameters. Some embodiments thereof are described below with reference to FIG. 7.

The encoder 120 may provide the compressed data CDT to the application processor 200 through the interface (I/F) 130. According to some embodiments, the interface (I/F) 130 may be implemented as a camera serial interface (CSI) based on a mobile industry processor interface (MIPI). However, the type of the interface (I/F) 130 is not limited thereto, and the interface (I/F) 130 may be implemented according to various protocol standards.

According to some embodiments, the application processor 200 may generate an image to be displayed on a display (not shown) by converting the compressed data CDT received from the image sensor module 100. For example, the application processor 200 may receive the compressed data CDT from the image sensor module 100, decompress the compressed data CDT to generate decompressed data DDT, and image-process the decompressed data DDT.

The application processor 200 may include an interface (I/F) 210, a memory 220, a decoder 230, and an image signal processor 240. According to some embodiments, the application processor 200 may receive the compressed data CDT from the image sensor module 100 through the interface (I/F) 210. The interface (I/F) 210 may be implemented as a MIPI like the interface (I/F) 130 provided in the image sensor module 100 but embodiments are not limited thereto. The application processor 200 may store received compressed data CDT in the memory 220.

The memory 220 is a storage for storing data. The compressed data CDT may be stored in the memory 220. Furthermore, the memory 220 may store other data, e.g., an operating system (OS), various programs, and various data (e.g., the compressed data CDT). The memory 220 may include a volatile memory like dynamic random access memory (DRAM) and static RAM (SRAM) or a non-volatile memory like phase change RAM (PRAM), resistive RAM (ReRAM), magnetic RAM (MRAM), and a flash memory. Although FIG. 1 shows that the memory 220 is included in the application processor 200, embodiments are not limited thereto, and the memory 220 may be provided separately outside the application processor 200.

The decoder 230 may read the compressed data CDT from the memory 220 and decompress the compressed data CDT, thereby generating the decompressed data DDT. The decoder 230 may provide the decompressed data DDT to the image signal processor 240.

The decoder 230 may decompress the compressed data CDT in units of pixel groups according to a decompression scheme (or decoding scheme) that corresponds to a compression scheme (or encoding scheme) performed by the encoder 120 of the image sensor module 100. Here, the decoder 230 may determine a compression scheme applied to a pixel group based on compression information included in the bitstream of the compressed data CDT. The decoder 230 may decompress target pixels of a target pixel group based on a reference map including reference values corresponding to pixels decompressed prior to the target pixel group to be decompressed (i.e., reference pixels).

The decoder 230 may include a statistic circuit 233. The statistic circuit 233 may generate statistical data by performing an arithmetic operation based on restored data generated in a decoding process. According to some embodiments, the restored data may include pixel values having reference values. For example, the restored data may be data including pixel values of a pixel group that was decompressed prior to a target pixel group. Some embodiments in which the statistic circuit 233 generates statistical data by performing an arithmetic operation based on restored data are described below with reference to FIGS. 3 and 8.

The decoder 230 may generate configuration parameters by performing an arithmetic operation based on the statistical data generated by the statistic circuit 233 and may change setting values of the decoder 230 based on the configuration parameters. Some embodiments thereof are described below with reference to FIGS. 7 and 8.

In image processing, it is advantageous to change setting values of an encoder and a decoder to achieve image quality improvement and function change. When changed setting values of the encoder are not synchronized with changed setting values of the decoder in real time, the compressed data CDT may be decompressed in units of pixel group according to a decoding scheme corresponding to an encoding scheme before change of setting values, and thus, a visual error may occur and a normal image may not be output.

According to the related art, to synchronize setting values of the encoder with setting values of the decoder, the encoder may further include information regarding changed setting values of the encoder in a bitstream and transmit the bitstream to the decoder. The decoder may change setting values of the decoder based on the information regarding changed setting values of the encoder included in the bitstream. However, it may take a long time to change setting values (e.g., several frames) and real-time synchronization may not be possible. Also, a separate logic for transmitting information regarding changed encoder setting values may be needed, and thus, the complexity of an image processing device may increase.

By contrast, according to some embodiments, the statistic circuit 124 and the statistic circuit 233 may be the same circuit functionally and may generate statistical data by performing an arithmetic operation based on restored data. The restored data may include pixel values having reference values, may be generated by the encoder 120 in the encoding process, and may be generated by the decoder 230 in the decoding process, and thus, it may not be necessary to configure additional logic. It may not be necessary to transfer information between the encoder 120 and the decoder 230 (e.g., to transfer information regarding changed setting values of the encoder as in the related art). Therefore, there may be no time needed for information transmission, and real-time synchronization between the encoder 120 and the decoder 230 may be possible based on restored data, thereby resolving a visual error. Also, the complexity of the image processing device 10 may be lower than that of the related art. In other words, rather than transmit information on changed settings in the bitstream, various embodiments rely on statistical information on the restored data to derive the changed settings such that the changed settings need not be transmitted between the encoder and decoder.

The image processing device 10 may generate configuration parameters by performing an arithmetic operation based on statistical data generated by the statistic circuit 124 and may change setting values of the encoder 120 based on the configuration parameters. According to some embodiments, the image processing device 10 may further include firmware, and the firmware may generate configuration parameters by performing an arithmetic operation based on statistical data. Some embodiments thereof are described below with reference to FIG. 6. According to some embodiments, each of the encoder 120 and the decoder 230 may further include a multiplexer, wherein a multiplexer included in encoder 120 may transmit any one of a configuration parameter generated by the firmware and a configuration parameter generated by the encoder 120 to a register, and a multiplexer included in the decoder 230 may transmit any one of a configuration parameter generated by the firmware and a configuration parameter generated by the decoder 230 to the register. Some embodiments thereof are described below with reference to FIG. 7.

The image signal processor 240 may perform various image processing on received decompressed data DDT. As a non-limiting example, the image signal processor 240 performs at least one image processing from among bad pixel correction, offset correction, lens distortion correction, color gain correction, shading correction, gamma correction, denoising, and sharpening on the decompressed data DDT. According to some embodiments, some of the above-stated image processing may be omitted according to the performance of the image sensor module 100. For example, when the image sensor module 100 includes the image sensor 110 of high quality, bad pixel correction (in particular, static bad pixel correction) or offset correction from among the image processing may be omitted.

The encoder 120 and the decoder 230 may each be implemented in software or hardware, or a combination of software and hardware like firmware. When the encoder 120 and the decoder 230 are implemented in software, the encoder 120 and the decoder 230 may be implemented as source code in which the above-stated functions are programmed and may be loaded into a storage medium provided in each of the image sensor module 100 and the application processor 200, and the functions of the encoder 120 and the decoder 230 may be implemented as a processor (e.g., an image processor) included in each of the image sensor module 100 and the application processor 200 executes the software. When the encoder 120 and the decoder 230 are implemented in hardware, the encoder 120 and the decoder 230 may each include a logic circuit and a register and may perform the above-stated functions based on register settings.

Although FIG. 1 shows that the image processing device 10 includes the image sensor module 100 and the application processor 200, embodiments are not limited thereto. For example, in some embodiments, the image processing device 10 may include only some of the image sensor module 100 and the application processor 200 or may include a plurality of image sensor modules 100. Also, although FIG. 1 shows that the decoder 230 and the image signal processor 240 are separate components, embodiments are not limited thereto. For example, in some embodiments, the image signal processor 240 may be implemented to include the decoder 230.

FIG. 2 is a block diagram showing an encoder including a statistic circuit according to an embodiment. According to some embodiments, an encoder 120*a* of FIG. 2 may be an example of the encoder 120 of FIG. 1, and descriptions identical to those given above with reference to FIG. 1 are omitted for conciseness. Referring to FIG. 2, the encoder 120*a* may include a reference pixel detector 121, a compressor 122, a reconstruction image generator 123, and a statistic circuit 124*a*.

The reference pixel detector 121 may store restored data. According to some embodiments, the reference pixel detector 121 may include a line memory and may store reference pixels located around target pixels of a target pixel group. According to some embodiments, the reference pixel detector 121 may include a volatile memory like DRAM or SRAM. However, embodiments are not limited thereto, and in some embodiments, the reference pixel detector 121 may include a non-volatile memory like ReRAM or PRAM.

The reference pixel detector 121 may receive the image data IDT from the image sensor (110 of FIG. 1) and receive a reference map including reference values of reference pixels used for compression of a target pixel group from an internal memory. The reference pixel detector 121 may detect reference values of reference pixels positionally close to the target pixel group, that is, restored pixel values of the reference pixels, from restored data stored therein and receive the reference values from the internal memory as a reference map. The reference pixel detector 121 may provide the target pixel group of the image data IDT and the reference map to the compressor 122.

The compressor 122 may compress the target pixel group based on the reference map. According to some embodiments, the compressor 122 may encode the target pixel group by using a differential pulse code modulation (DPCM)-based encoding scheme based on the reference map. According to some embodiments, the compressor 122 may generate difference values between a reference value of a reference pixel and pixel values of target pixels, difference values between the pixel values of the target pixels, and generate a bitstream based on the difference values. According to some embodiments, the compressor 122 may generate difference values between the average value of the pixel values of the target pixels and the reference value of the reference pixel, and generate a bitstream based on the difference values. The bitstream generated by the compressor 122 may be output as the compressed data CDT.

The reconstruction image generator 123 may generate restored data by decoding the compressed data CDT. The reconstruction image generator 123 may restore pixel values of the target pixel group by decoding each of a plurality of bitstreams included in the compressed data CDT by using a decoding scheme corresponding to an encoding scheme used to encode the corresponding bitstream. Pixels corresponding to restored pixel values may be used as reference pixels for another target pixel group to be compressed and may be used to generate statistical data.

The statistic circuit 124*a* may receive restored data RD from the reconstruction image generator 123 and generate statistical data by performing an arithmetic operation based on the received restored data RD. As a non-limiting example, the arithmetic operation may be an arithmetic operation of multiplying pixel values included in the restored data RD by a weight and summing the results into one piece of data. Some embodiments of the arithmetic operation are described below with reference to FIG. 3.

According to some embodiments, statistical data may be used to change setting values of the encoder 120*a*, and, when generated based on data identical or similar data to the image data IDT, the statistical data may be used for image quality improvement, function change, etc. in image processing. To resolve a visual error, the encoder 120*a* and the decoder (230 of FIG. 1) need to be synchronized in real time. The restored data RD similar to the image data IDT is generated in the encoding process and the decoding process, whereas the image data IDT is not generated in the decoding process. Therefore, a separate information transmission logic may be needed. When a separate information transmission logic is added, the complexity of the image processing device (10 of FIG. 1) may increase and manufacturing cost thereof may increase. When statistical data is generated based on the restored data RD, additional logic may not be needed, and the encoder 120*a* and the decoder (230 of FIG. 1) may be synchronized in real time without increasing the complexity of the image processing device (10 of FIG. 1). In other words, image quality improvement and function change in image processing may be handled without increasing the manufacturing cost of the image processing device (10 of FIG. 1).

Figure 3:
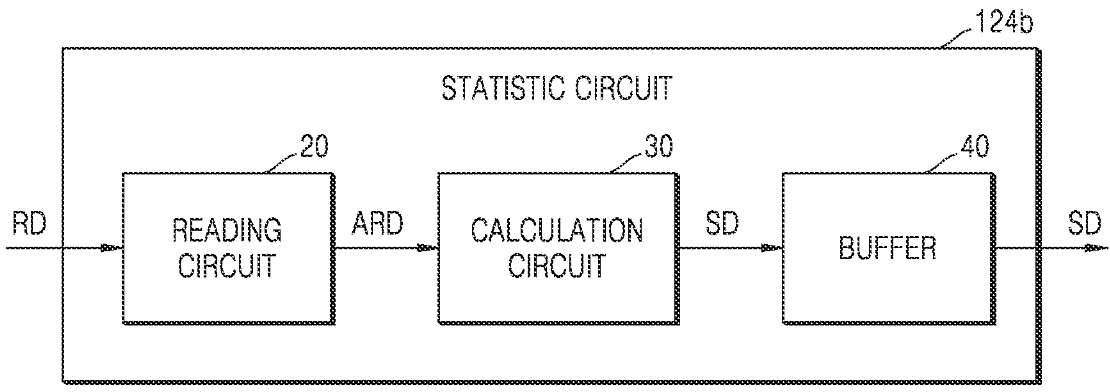
FIG. 3 is a block diagram showing a statistic circuit according to an embodiment.

FIG. 3 is a block diagram showing a statistic circuit according to an embodiment. According to some embodiments, a statistic circuit 124*b* of FIG. 3 may be an example of the statistic circuit 124 of FIG. 1, and a description identical to those given above with reference to FIG. 2 is omitted for conciseness. Referring to FIG. 3, the statistic circuit 124*b* may include a reading circuit 20, a calculation circuit 30, and a buffer 40.

The reading circuit 20 may receive the restored data RD from the reconstruction image generator 123 and generate accumulated restored data ARD by accumulating the restored data RD. According to some embodiments, the restored data RD may include a plurality of pixels. The reading circuit 20 may generate the accumulated restored data ARD by accumulating the plurality of pixels of the restored data RD and may transmit the accumulated restored data ARD to the calculation circuit 30. The reading circuit 20 may receive the restored data RD from a memory (not shown) inside an encoder 120*b*. Some embodiments of the configuration and accumulation operation of the reading circuit 20 are described below with reference to FIGS. 4A and 4B.

The calculation circuit 30 may receive the accumulated restored data ARD from the reading circuit 20 and may generate statistical data SD by performing an arithmetic operation based on the accumulated restored data ARD. According to some embodiments, the calculation circuit 30 may include an arithmetic operation circuit (not shown) capable of generating the statistical data SD. As a non-limiting example, the statistical data SD may include luminance data (or referred to as luminance information), and the arithmetic operation circuit may generate the luminance data based on the accumulated restored data ARD. For example, the accumulated restored data ARD may include data accumulated for respective colors (e.g., red, green, and blue), and the arithmetic operation circuit may generate the luminance data by performing an arithmetic operation of multiplying the weight for each color and summing results thereof into one piece of data. As a non-limiting example, the statistical data SD may include direction data (or referred to as direction information) or sensitivity data (or sensitivity information), and the arithmetic operation circuit may generate the direction data or the sensitivity data based on the accumulated restored data ARD.

The buffer 40 may receive the statistical data SD from the calculation circuit 30 and may store the received statistical data SD. According to some embodiments, the buffer 40 may be implemented as a flip-flop or a memory. For example, when the size of the statistical data SD is large, the buffer 40 may be implemented as a memory, and, when the size of the statistical data SD is small, the buffer 40 may be implemented as a flip-flop. According to some embodiments, the buffer 40 may store the statistical data SD and, when setting values of the encoder 120*b* need to be changed, transmit the statistical data SD to an internal circuit (e.g., a parameter generation circuit 126 of FIG. 7) or firmware (e.g., 150*a* of FIG. 7) at a corresponding frame.

Figure 4A:
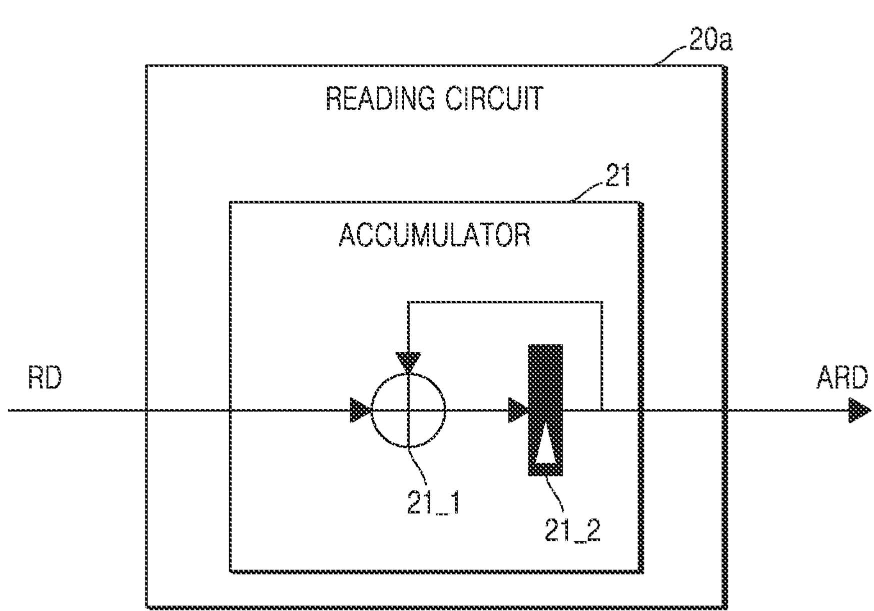
FIG. 4A is a block diagram showing a reading circuit according to an embodiment.
Figure 4B:
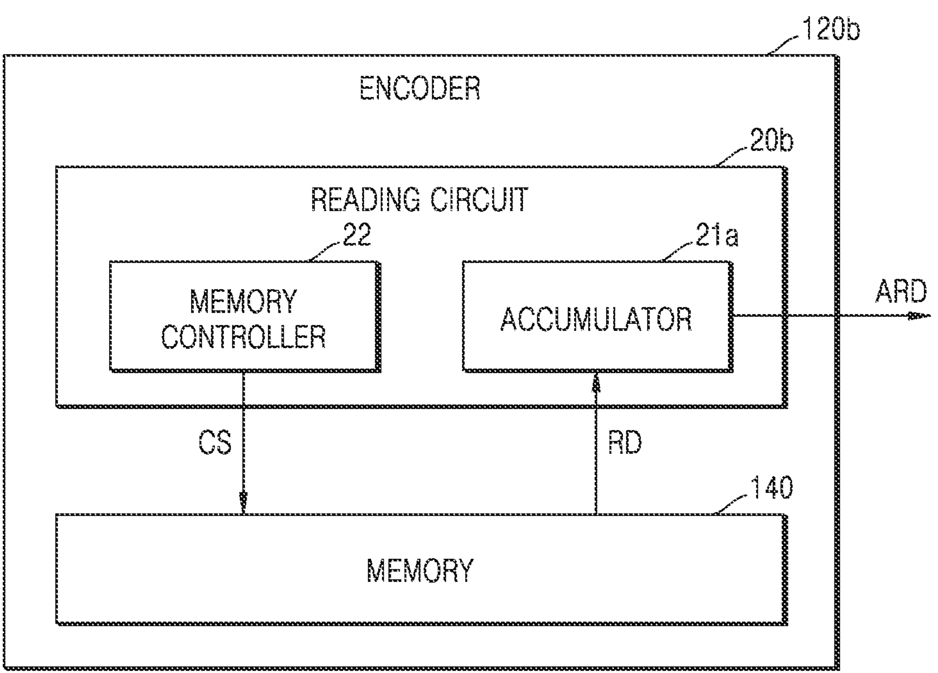
FIG. 4B is a block diagram showing an encoder including the reading circuit according to an embodiment.

FIG. 4A is a block diagram showing a reading circuit according to an embodiment, and FIG. 4B is a block diagram showing an encoder including the reading circuit according to an embodiment. According to some embodiments, a reading circuit 20*a* of FIG. 4A or a reading circuit 20*b* of FIG. 4B may be an example of the reading circuit 20 of FIG. 3, and the encoder 120*b* of FIG. 4B may be an example of the encoder 120*a* of FIG. 2. Descriptions identical to those given above with reference to FIGS. 2 and 3 are omitted for conciseness.

Referring to FIG. 4A, the reading circuit 20*a* may include an accumulator 21. According to some embodiments, the accumulator 21 may receive the restored data RD from the reconstruction image generator (123 of FIG. 2) and generate accumulated restored data ARD by accumulating the restored data RD. The accumulator 21 may include an adding circuit 21_1 and a storage circuit 21_2. According to some embodiments, the adding circuit 21_1 may receive the restored data RD from the reconstruction image generator (123 of FIG. 2) and accumulated data from the storage circuit 21_2. The adding circuit 21_1 may generate the accumulated restored data ARD by performing an addition operation on the received restored data RD and the accumulated data. For example, the adding circuit 21_1 may receive first restored data, receive first accumulated data from the storage circuit 21_2, and generate second accumulated data by performing an addition operation on the first restored data and the first accumulated data. The storage circuit 21_2 may receive and store the second accumulated data and may transmit the stored second accumulated data to the adding circuit 21_1. The adding circuit 21_1 may receive second restored data, receive the second accumulated data from the storage circuit 21_2, and generate third accumulated data by performing an addition operation on the second restored data and the second accumulated data. The third accumulated data may correspond to the accumulated restored data ARD, and the accumulated restored data ARD may be transmitted to the storage circuit 21_2.

According to some embodiments, the storage circuit 21_2 may receive accumulated data from the adding circuit 21_1 and may store the accumulated data. For example, when the accumulated data is not accumulated as much as designated data, the accumulated data may be transmitted to the adding circuit 21_1. In some embodiments, the designated data may be a threshold amount of data. When the accumulated data is accumulated as much as designated data, the accumulated data may be stored as the accumulated restored data ARD, and the accumulated restored data ARD may be transmitted to the calculation circuit (30 of FIG. 3). The storage circuit 21_2 may be implemented as a flip-flop.

Referring to FIG. 4B, the encoder 120*b* may include the reading circuit 20*b* and a memory 140. The memory 140 may store the restored data RD. According to some embodiments, the memory 140 may be implemented with a volatile memory like DRAM or SRAM or may be implemented with a non-volatile memory like ReRAM or PRAM.

The reading circuit 20*b* may include a memory controller 22 and an accumulator 21*a*. The accumulator 21*a* may be identical to the accumulator 21 of FIG. 4A, and descriptions identical to those given above are omitted for conciseness. The memory controller 22 may generate a control signal CS capable of controlling the memory 140. According to some embodiments, the memory 140 may receive the control signal CS from the memory controller 22 and, based on the control signal CS, transmit the restored data RD to the accumulator 21*a* until accumulated data stored in the accumulator 21*a* is accumulated as much as designated data.

FIG. 5 is a block diagram showing a statistic circuit according to an embodiment. According to some embodiments, a statistic circuit 124*c* of FIG. 5 may be an example of the statistic circuit 124*a* of FIG. 3, and the statistic circuit 124*c* may include a reading circuit 20*c*, a calculation circuit 30*c*, a buffer 40*c*, and a calculation circuit controller 50. The reading circuit 20*c*, the calculation circuit 30*c*, and the buffer 40*c* may be identical to the reading circuit 20, the calculation circuit 30, and the buffer 40 of FIG. 3, respectively, and descriptions identical to those given above with reference to FIG. 3 are omitted for conciseness.

The calculation circuit controller 50 may control the calculation circuit 30*c*. According to some embodiments, the calculation circuit controller 50 may control the size of the accumulated restored data ARD received by the calculation circuit 30*c*. For example, the accumulated restored data ARD may include line data regarding at least one line or frame data regarding at least one frame. Frame data regarding one frame may include line data regarding a plurality of lines, and line data regarding one line may include pixel values regarding a plurality of pixels of a line. As another example, line data regarding two lines may include pixel values regarding a plurality of pixel values of the two lines, etc. The calculation circuit 30*c* may, for example, generate the statistical data SD based on the accumulated restored data ARD including line data regarding two lines, generate the accumulated restored data ARD including line data regarding four lines, or generate the statistical data SD based on the accumulated restored data ARD including frame data regarding one frame. The calculation circuit controller 50 may receive a control signal from firmware (e.g., 150 of FIG. 6) and, based on the control signal, transmit a signal for controlling the calculation circuit 30*c* to receive the accumulated restored data ARD including, for example, line data regarding two lines, line data regarding four lines, or frame data regarding one frame.

According to some embodiments, the calculation circuit controller 50 may include a line counter 51 and a state circuit 52. The line counter 51 may be a circuit capable of counting the number of lines of the accumulated restored data ARD, and the state circuit 52 may be a circuit generating a signal for controlling the operation start time and/or the operation end time of the arithmetic operation circuit of the calculation circuit 30*c*. For example, the line counter 51 may receive a control signal from firmware (e.g., 150 of FIG. 6) and, based on the control signal, count two lines, four lines, or the number of lines included in one frame. A signal for controlling the calculation circuit 30*c* may be generated based on a counted number of lines. The state circuit 52 may receive a control signal from firmware (e.g., 150 of FIG. 6), and based on the control signal, generate a signal for controlling the operation start time and/or the operation end time of the arithmetic operation circuit of the calculation circuit 30*c*.

Figure 6:
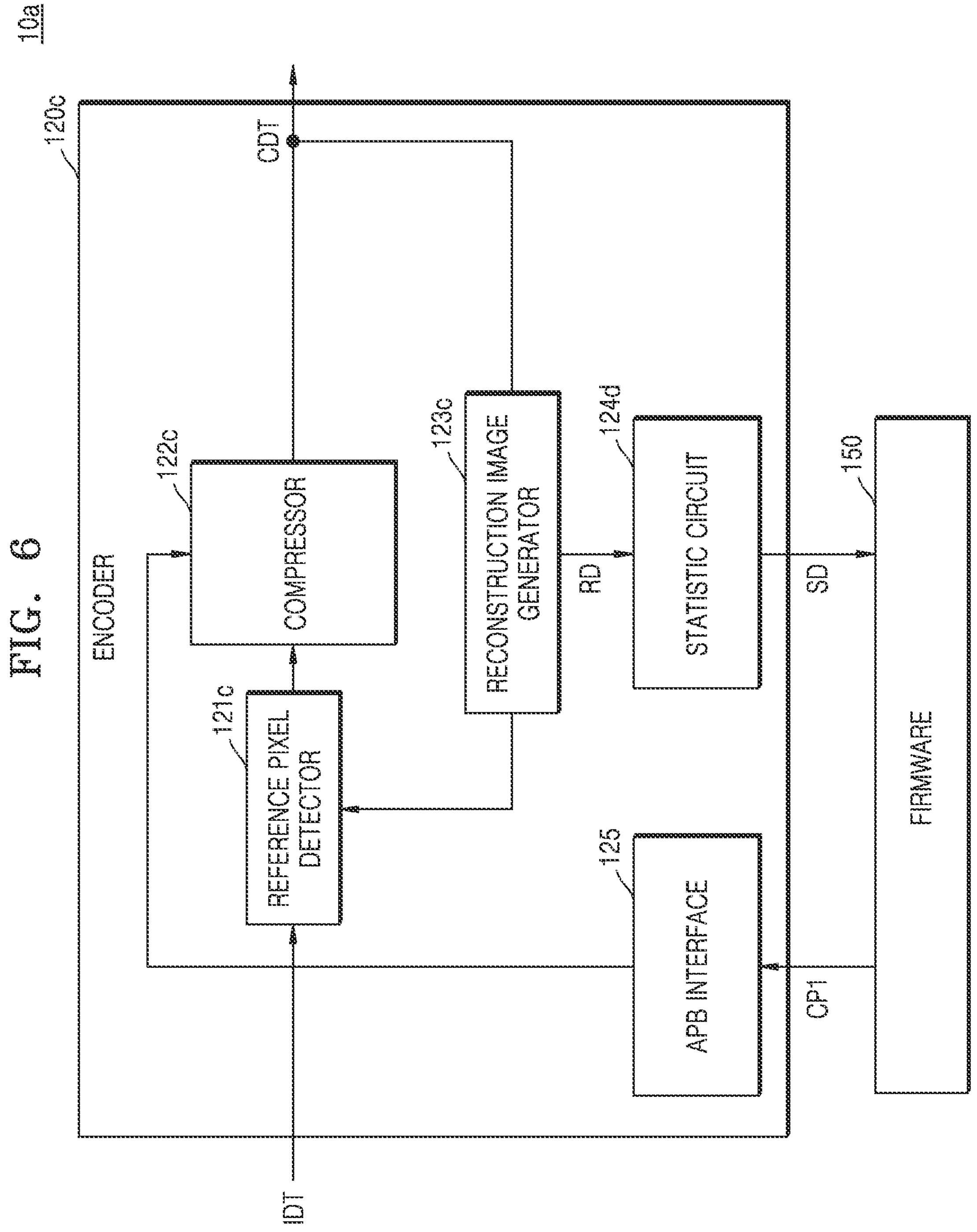
FIG. 6 is a block diagram showing an image processing device including an encoder, according to an embodiment.

FIG. 6 is a block diagram showing an image processing device including an encoder, according to an embodiment. According to some embodiments, an image processing device 10*a* of FIG. 6 may be an example of the image processing device 10 of FIG. 1, and an encoder 120*c* of FIG. 6 may be an example of the encoder 120*a* of FIG. 2. Descriptions identical to descriptions given above with reference to FIGS. 1 and 2 are omitted for conciseness.

Referring to FIG. 6, the image processing device 10*a* may include the encoder 120*c* and firmware 150. In some embodiments, the firmware 150 may be software included in a particular hardware device and may refer to a device capable of reading, executing, or modifying software, and may also refer to a type of OS for controlling and driving hardware. According to some embodiments, the firmware 150 may receive the statistical data SD from a statistic circuit 124*d* and generate a first configuration parameter CP1 by performing an arithmetic operation based on the statistical data SD. As a non-limiting example, the statistical data SD may include at least one of luminance data, direction data, or sensitivity data. When the statistical data SD includes luminance data, the firmware 150 may perform an arithmetic operation of comparing the magnitude of a luminance data value with a threshold luminance data value and, when the luminance data value is greater than the threshold luminance data value, generate the first configuration parameter CP1 for adjusting a luminance setting value of the encoder 120*c*.

The encoder 120*c* may include a reference pixel detector 121*c*, a compressor 122*c*, a reconstruction image generator 123*c*, a statistic circuit 124*d*, and an advanced peripheral bus (APB) interface 125. The reference pixel detector 121*c*, the compressor 122*c*, the reconstruction image generator 123*c*, and the statistic circuit 124*d* may be respectively identical to the reference pixel detector 121, the compressor 122, the reconstruction image generator 123, and the statistic circuit 124*a* of FIG. 2 and thus repeated description thereof is omitted for conciseness.

The APB interface 125 may be a bus architecture used in the system-on-chip (SoC) design and may be a circuit implemented to enable communication between the encoder 120*c* and the firmware 150. According to some embodiments, the APB interface 125 may receive the first configuration parameter CP1 from the firmware 150 and may transmit the first configuration parameter CP1 to the compressor 122*c*. The encoder 120*c* may change a setting value of the encoder 120*c* based on the first configuration parameter CP1. For example, the compressor 122*c* may include a plurality of registers, and the encoder 120*c* may change a value of a particular register from among the plurality of registers based on the first configuration parameter CP1. A case in which a value of a particular register is changed may be the same as a case in which a setting value of the encoder 120*c* is changed.

Figure 7:
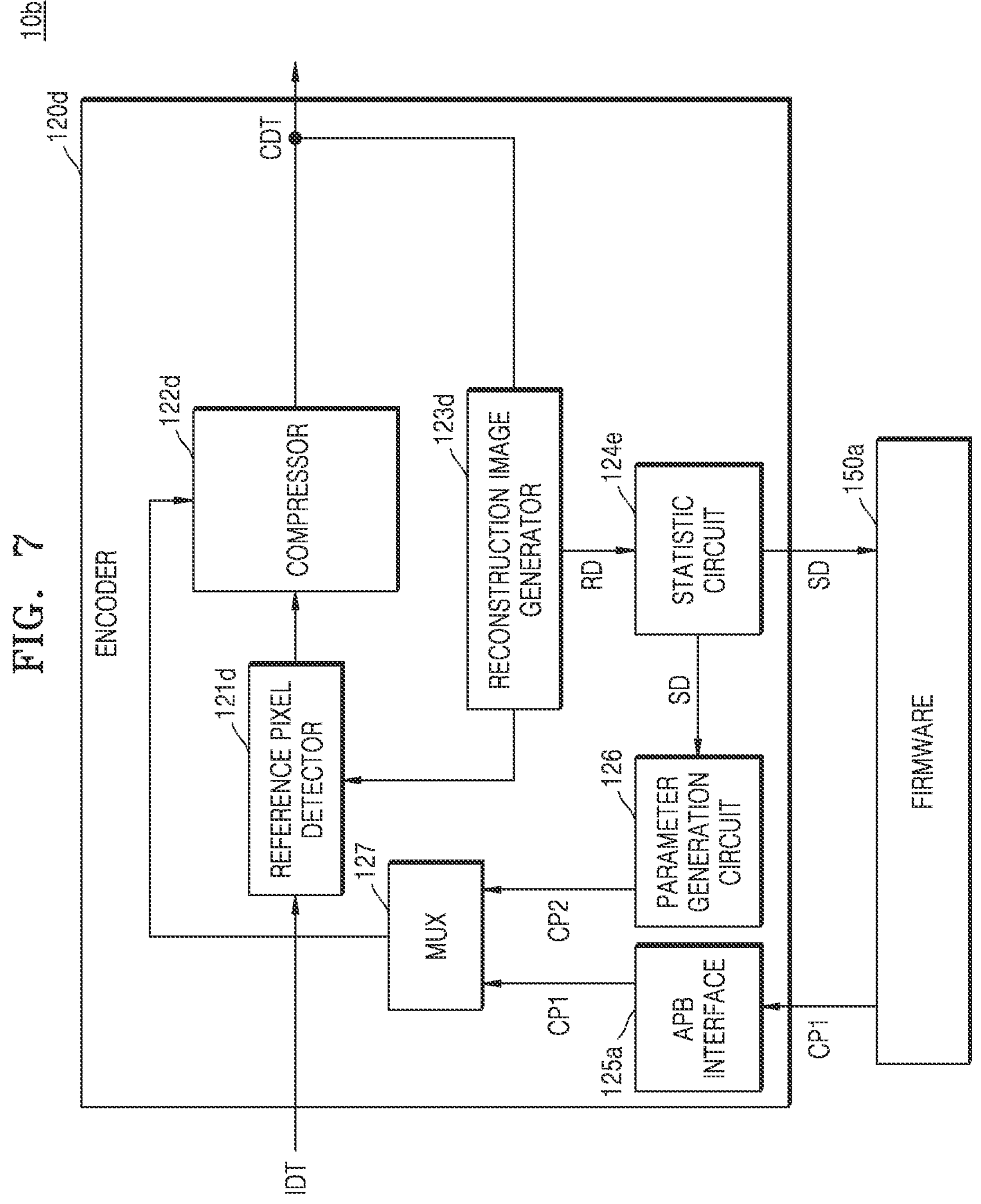
FIG. 7 is a block diagram showing an image processing device including an encoder, according to an embodiment.

FIG. 7 is a block diagram showing an image processing device including an encoder, according to an embodiment. According to some embodiments, an image processing device 10*b* of FIG. 7 may be an example of the image processing device 10*a* of FIG. 6, and descriptions identical to those given above with reference to FIG. 6 are omitted for conciseness. The image processing device 10*b* may include an encoder 120*d* and firmware 150*a*, and the firmware 150*a* may be identical to the firmware 150 of FIG. 6 and thus repeated description thereof is omitted for conciseness.

Referring to FIG. 7, the encoder 120*d* may include a reference pixel detector 121*d*, a compressor 122*d*, a reconstruction image generator 123*d*, a statistic circuit 124*e*, an APB interface 125*a*, the parameter generation circuit 126, and a multiplexer (MUX) 127. The reference pixel detector 121*d*, the compressor 122*d*, the reconstruction image generator 123*d*, the statistic circuit 124*e*, and the APB interface 125*a* may be identical to the reference pixel detector 121*c*, the compressor 122*c*, the reconstruction image generator 123*c*, the statistic circuit 124*d*, and the APB interface 125 of FIG. 6, respectively, and thus repeated description thereof is omitted for conciseness.

The parameter generation circuit 126 may receive the statistical data SD from the statistic circuit 124*e* and generate a second configuration parameter CP2 by performing an arithmetic operation based on the statistical data SD. As a non-limiting example, the statistical data SD may include at least one of luminance data, direction data, or sensitivity data. For example, statistical data SD may include luminance data. When the statistical data SD includes luminance data, the parameter generation circuit 126 may perform an arithmetic operation of comparing the magnitude of a luminance data value with a threshold luminance data value and, when the luminance data value is greater than the threshold luminance data value, generate the second configuration parameter CP2 for adjusting a luminance setting value of the encoder 120*d*. When the luminance data value is less than or equal to the threshold luminance data value, the parameters generation circuit 126 may not generate the second configuration parameter CP2 or may generate the second configuration parameter CP2 with a set value.

The multiplexer (MUX) 127 may be a device that selects one from among several analog or digital input signals and transmits the selected input signal to one line. According to some embodiments, the multiplexer 127 may receive the first configuration parameter CP1 and the second configuration parameter CP2, select one of the first configuration parameter CP1 and the second configuration parameter CP2, and transmit the selected one to the compressor 122*d*. The encoder 120*d* may change a setting value of the encoder 120*d* based on the first configuration parameter CP1 or the second configuration parameter CP2 that is selected by the multiplexer 127. For example, the compressor 122*d* may include a plurality of registers, and the encoder 120*d* may change a value of a particular register from among the plurality of registers based on the first configuration parameter CP1 or the second configuration parameter CP2 selected by the multiplexer 127. A case in which a value of a particular register is changed may be the same as a case in which a setting value of the encoder 120*d* is changed.

A setting value of the encoder 120*d* may be changed based on a configuration parameter (e.g., CP1 or CP2) generated by the firmware 150*a* or the parameter generation circuit 126. The configuration parameter is a value simply calculated based on the statistical data SD, and, since a set value may be changed with a small operation, power consumption may be reduced.

When the setting value of the encoder 120*d* is changed based on configuration parameters generated by the parameter generation circuit 126, there may be no process of transmitting statistical data and configuration parameters between the encoder 120*d* and the firmware 150*a*, and the configuration parameter may be generated within the encoder 120*d*. Therefore, the setting value of the encoder 120*d* may be changed in less time.

Figure 8:
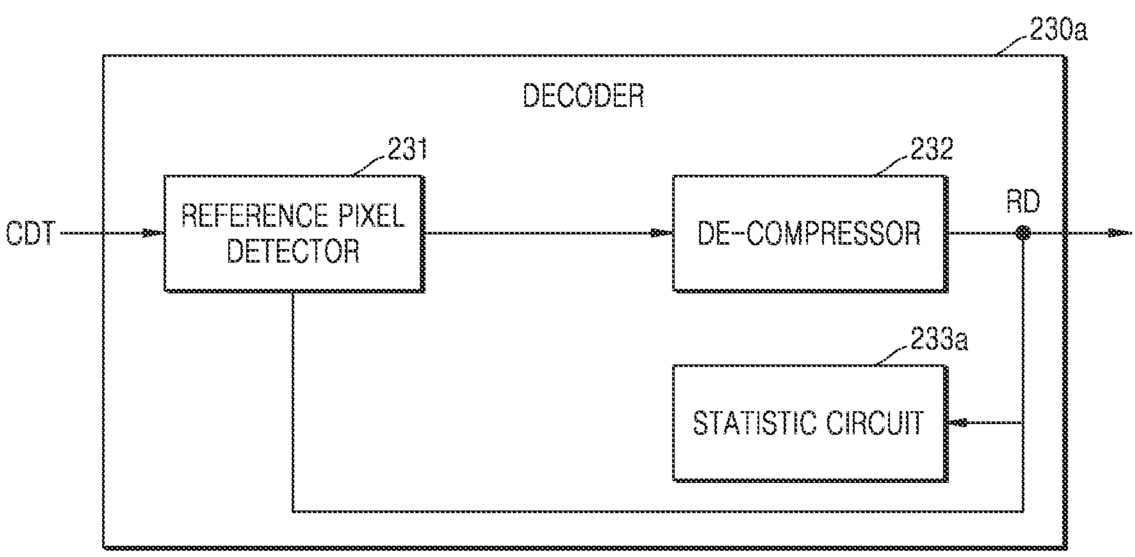
FIG. 8 is a block diagram showing a decoder including a statistic circuit, according to an embodiment.

FIG. 8 is a block diagram showing an decoder including a statistic circuit, according to an embodiment. According to some embodiments, a decoder 230*a* of FIG. 8 may be an example of the decoder 230 of FIG. 1, and descriptions identical to those given above with reference to FIG. 1 are omitted for conciseness.

The decoder 230*a* may decompress the compressed data CDT by performing a series of processes, which the encoder (120 of FIG. 1) performs to encode the image data IDT, in reverse order, thereby generating decompressed data, e.g., the restored data RD. The decoder 230*a* may decompress the compressed data CDT by using a decoding scheme corresponding to an encoding scheme used by the encoder 120. The decoder 230*a* may decode the compressed data CDT in units of bitstreams. The decoder 230*a* may include a reference pixel detector 231, a decompressor 232, and a statistic circuit 233*a*.

The reference pixel detector 231 may store decompressed data, that is, the restored data RD. According to some embodiments, the reference pixel detector 231 may store pixel values of a pixel group corresponding to a bitstream of the compressed data CDT to be decompressed next from among decompressed data (which is the restored data RD). According to some embodiments, a memory or a buffer (e.g., the memory 220) provided in the application processor (200 of FIG. 1) may be used as an internal memory of the reference pixel detector 231.

The reference pixel detector 231 may receive the compressed data CDT and receive a reference map to be used for decompression of a target bitstream to be decompressed from among bitstreams included in the compressed data CDT from an internal memory. The reference map may include reference values of pixels around a pixel group related to a reference target bitstream, that is, reference pixels.

The reference pixel detector 231 may detect reference values of reference pixels positionally close to the target pixel group, that is, restored pixel values of the reference pixels, from the restored data RD stored therein and receive the reference values from the internal memory as a reference map.

The decompressor 232 may restore target pixels from a bitstream in a decoding process based on a determined compression mode, a compression rate, loss information, etc. Pixel groups generated by decoding the bitstream in the decoding process may be output as decompressed data, that is, the restored data RD.

The statistic circuit 233*a* may receive the restored data RD from the decoding process from the decompressor 232 and generate statistical data by performing an arithmetic operation based on the received restored data RD. The restored data RD may be pixel values of pixel groups generated by decoding a bitstream.

According to some embodiments, the statistic circuit 233*a* may be identical in configuration and function to the statistic circuits 124 to 124*e* included in encoders described with reference to FIGS. 2 to 7 except that the statistic circuit 233*a* may operate on the restored data RD from the decoding process. Therefore, statistical data may be generated by performing an arithmetic operation based on restored data. The restored data may include pixel values having reference values, may be generated by the encoder (120 of FIG. 1) in the encoding process, and may be generated by the decoder 230*a* in the decoding process, and thus, it may not be necessary to configure an additional circuit for communicating information with the encoder (120 of FIG. 1). It may not be necessary to transfer information between the encoder (120 of FIG. 1) and the decoder 230*a*. Therefore, there may be no time needed for information transmission, and real-time synchronization between the encoder (120 of FIG. 1) and the decoder 230*a* may be possible based on restored data, thereby resolving a visual error.

According to some embodiments, the decoder 230*a* may further include an APB interface (not shown), and the APB interface (not shown) may perform the same function as the APB interface 125 of FIG. 6. For example, the firmware 150 of FIG. 6 may receive statistical data from the statistical circuit 233*a* and generate a first configuration parameter by performing an arithmetic operation based on the statistical data. The APB interface (not shown) may receive the first configuration parameter from the firmware 150 of FIG. 6 and transmit the first configuration parameter to the decompressor 232. The decompressor 232 may include a plurality of registers, and decoder 230*a* may change a value of a particular register from among the plurality of registers based on the first configuration parameter. A case in which a value of a particular register is changed may be the same as a case in which a setting value of the decoder 230*a* is changed.

According to some embodiments, the decoder 230*a* may further include a parameter generation circuit (not shown) and a multiplexer (not shown), and each of the parameter generation circuit (not shown) and the multiplexer (not shown) may perform the same function as the parameter circuit 126 of FIG. 7 and the multiplexer 127 of FIG. 7. For example, a parameter generation circuit (not shown) may receive statistical data from the statistical circuit 233*a* and generate a second configuration parameter by performing an arithmetic operation based on the statistical data. The multiplexer (not shown) may receive the first configuration parameter and the second configuration parameter, select one of the first configuration parameter and the second configuration parameter, and transmit the selected one to the decompressor 232. The decoder 230*a* may change the setting value of the decoder 230*a* based on the first configuration parameter or the second configuration parameter that is selected by the multiplexer (not shown).

Thus, in some embodiments, the image processing device may further comprise firmware configured to generate a first configuration parameter corresponding to a setting value of the encoder or a setting value of the decoder by performing an arithmetic operation based on the first statistical data or the second statistical data, wherein the encoder further comprises a first advanced peripheral bus (APB) interface configured to receive a first configuration parameter corresponding to a setting value of the encoder from the firmware and transmit the first configuration parameter corresponding to the setting value of the encoder to at least one encoder register of the encoder, such that the at least one encoder register changes the setting value of the encoder to the first configuration parameter corresponding to the setting value of the encoder, and the decoder further comprises a second APB interface configured to receive a first configuration parameter corresponding to a setting value of the decoder from the firmware and transmit the first configuration parameter corresponding to the setting value of the decoder to at least one decoder register of the encoder, such that the at least one decoder register changes the setting value of the decoder to the first configuration parameter corresponding to the setting value of the decoder.

In some embodiments, the encoder may further comprise a first parameter generation circuit configured to receive the first statistical data from the first statistic circuit and generate a second configuration parameter corresponding to a setting value of the encoder by performing an arithmetic operation based on the first statistical data; and a first multiplexer configured to receive the first configuration parameter corresponding to the setting value of the encoder from the first APB interface or receive the second configuration parameter from the first parameter generation circuit and transmit the first configuration parameter corresponding to the setting value of the encoder or the second configuration parameter to the at least one encoder register.

In some embodiments, the decoder may further comprises a second parameter generation circuit configured to receive the second statistical data from the second statistic circuit and generate a third configuration parameter corresponding to a setting value of the decoder by performing an arithmetic operation based on the second statistical data; and a second multiplexer configured to receive the first configuration parameter corresponding to the setting value of the decoder from the second APB interface or receive the third configuration parameter from the second parameter generation circuit and transmit the first configuration parameter corresponding to the setting value of the decoder or the third configuration parameter to the at least one decoder register.

Figure 9:
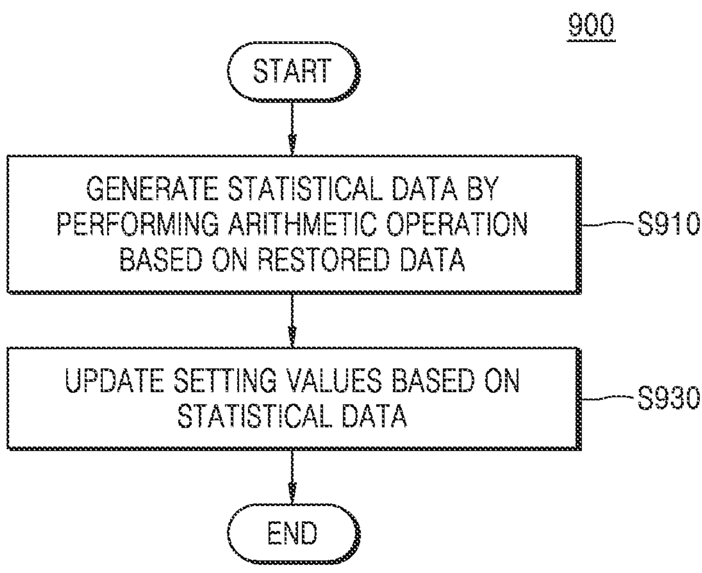
FIG. 9 is a flowchart of a method of synchronizing an encoder with a decoder, according to an embodiment.

FIG. 9 is a flowchart of a method of synchronizing an encoder with a decoder, according to an embodiment. As shown in FIG. 9, a method 900 of synchronizing an encoder with a decoder may include a plurality of operations S910 and S930.

Referring to FIGS. 1, 5, and 9, in operation S910, statistic circuits 124 and 233 may perform arithmetic operations based on restored data, thereby generating statistical data. For example, the statistic circuits 124 and 233 may perform arithmetic operations based on the restored data from the encoding process and the decoding process, respectively, thereby generating statistical data from each of the encoding process and the decoding process. According to some embodiments, the statistic circuits 124 and 233 may generate accumulated restored data by accumulating restored data and may generate statistical data by performing arithmetic operations based on the accumulated restored data. As a non-limiting example, the statistical data may include luminance data (or referred to as luminance information), and the statistic circuits 124 and 233 may generate the luminance data based on the accumulated restored data. For example, the accumulated restored data may include data accumulated for respective colors (e.g., red, green, and blue), and the statistic circuits 124 and 233 may generate the luminance data by performing an arithmetic operation of multiplying the weight for each color and summing results thereof into one piece of data. As a non-limiting example, the statistical data may include direction data (or referred to as direction information) or sensitivity data (or sensitivity information), and the statistic circuits 124 and 233 may generate the direction data or the sensitivity data based on the accumulated restored data.

According to some embodiments, the statistic circuits 124 and 233 may measure the number of lines of accumulated restored data based on a control signal received from firmware (e.g., 150 of FIG. 6) and may determine the size of the accumulated restored data based on the measured number of lines. For example, the accumulated restored data may include line data regarding at least one line or frame data regarding at least one frame. Frame data regarding one frame may include line data regarding a plurality of lines, and line data regarding one line may include pixel values regarding a plurality of pixels of a line. The statistic circuits 124 and 233 may measure the number of lines corresponding to, for example, two lines, four lines, or one frame based on a control signal. The statistic circuits 124 and 233 may generate statistical data by performing an arithmetic operation based on the determined size of the accumulated restored data. For example, the size of the accumulated restored data may be the size of accumulated restored data including one line, four lines, or the number of lines corresponding to one frame.

Further referring to FIG. 7, in operation S930, the encoder 120 and the decoder 230 may update setting values based on the statistical data. According to some embodiments, the encoder 120 and the decoder 230 may further include the parameter generation circuit 126, and the firmware **150*a* or the parameter generation circuit 126 may generate a configuration parameter CP1 or CP2, respectively, based on the statistical data. The encoder 120 and the decoder 230 may include a plurality of registers and may change a setting value of a particular register based on the configuration parameter CP1 or CP2 corresponding to the setting value. A case in which a setting value of particular register is changed may be the same as a case in which a setting value of the encoder 120 or the decoder 230** is changed.

Figure 10:
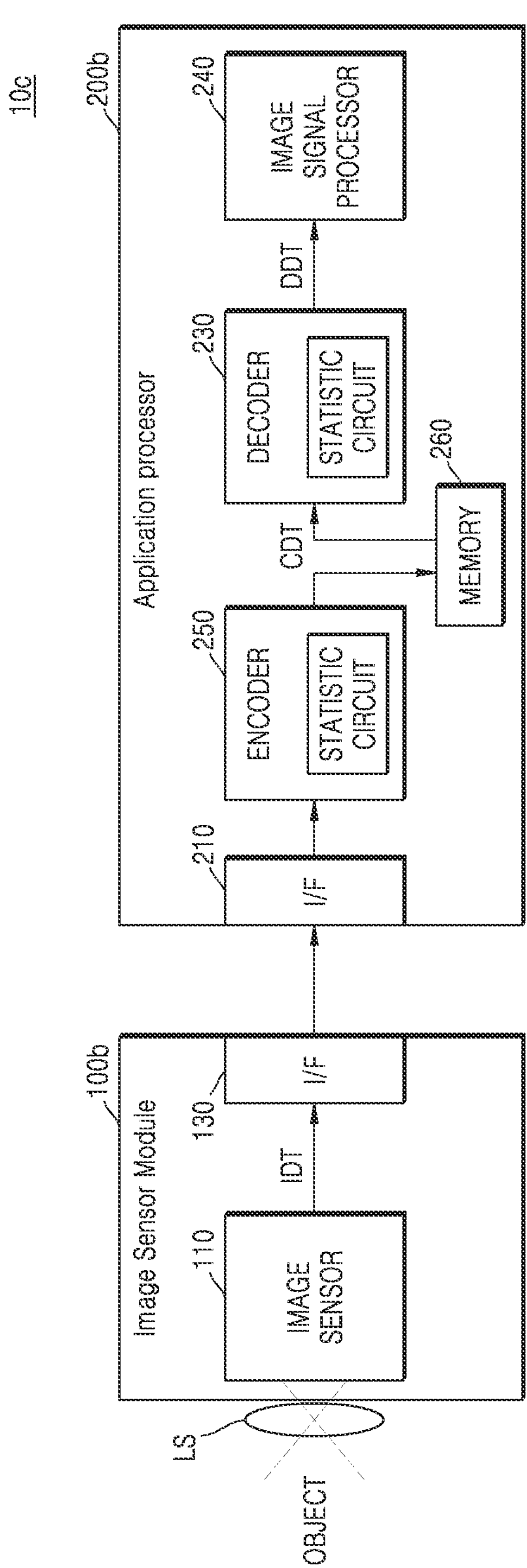
FIG. 10 is a block diagram showing an image processing device according to an embodiment.

FIG. 10 is a block diagram showing an image processing device according to an embodiment. FIG. 10 shows a modified embodiment of the image processing device 10 of FIG. 1.

Referring to FIG. 10, an image processing device **10*b* may include an image sensor module 100*b* and an application processor 200*b*. The image sensor module 100*b* may include the image sensor 110 and the interface (I/F) 130. In some embodiments, the image sensor module 100*b* may further include a memory. The application processor 200*b* may include the interface (I/F) 210, an encoder 250, the decoder 230, the image signal processor 240, and the memory 220. The encoder 250 of FIG. 10 may correspond to the encoder 120 of FIG. 1, and the decoder 230 of FIG. 10 may correspond to the decoder 230 of FIG. 1**.

Comparing the image processing device **10*b* of FIG. 10 to the image processing device 10 of FIG. 1, instead of the image sensor module 100*b*, the application processor 200*b* may include the encoder 250, and the application processor 200*b* may compress the image data IDT. The remaining components of the image processing device 10*b* may be substantially identical to the components of the image processing device 10 of FIG. 1. From among the components of the image processing device 10*b*, descriptions of components identical to the components of the image processing device 10 of FIG. 1** are omitted for conciseness.

Referring to FIG. 10, the image sensor 110 may generate the image data IDT (original image data or preprocessed image data). The image data IDT may be transmitted to the application processor 200*b* through the interface 130. The application processor 200*b* may receive the image data IDT from the image sensor module 100*b*, compress the image data IDT, and store the compressed data CDT in the memory 260. Thereafter, the decoder 230 may read the compressed data CDT stored in the memory 260 and decompress the compressed data CDT. The decoder 230 may provide the decompressed data CDT, e.g., reconstruction image data, to the image signal processor 240. The encoder 250 and the decoder 230 may include statistic circuits, and, as described with reference to FIGS. 1 to 9, the encoder 250 and the decoder 230 may be synchronized with one another in real time through the statistic circuits included in the encoder 250 and the decoder 230, and thus, visual errors may be resolved.

Figure 11:
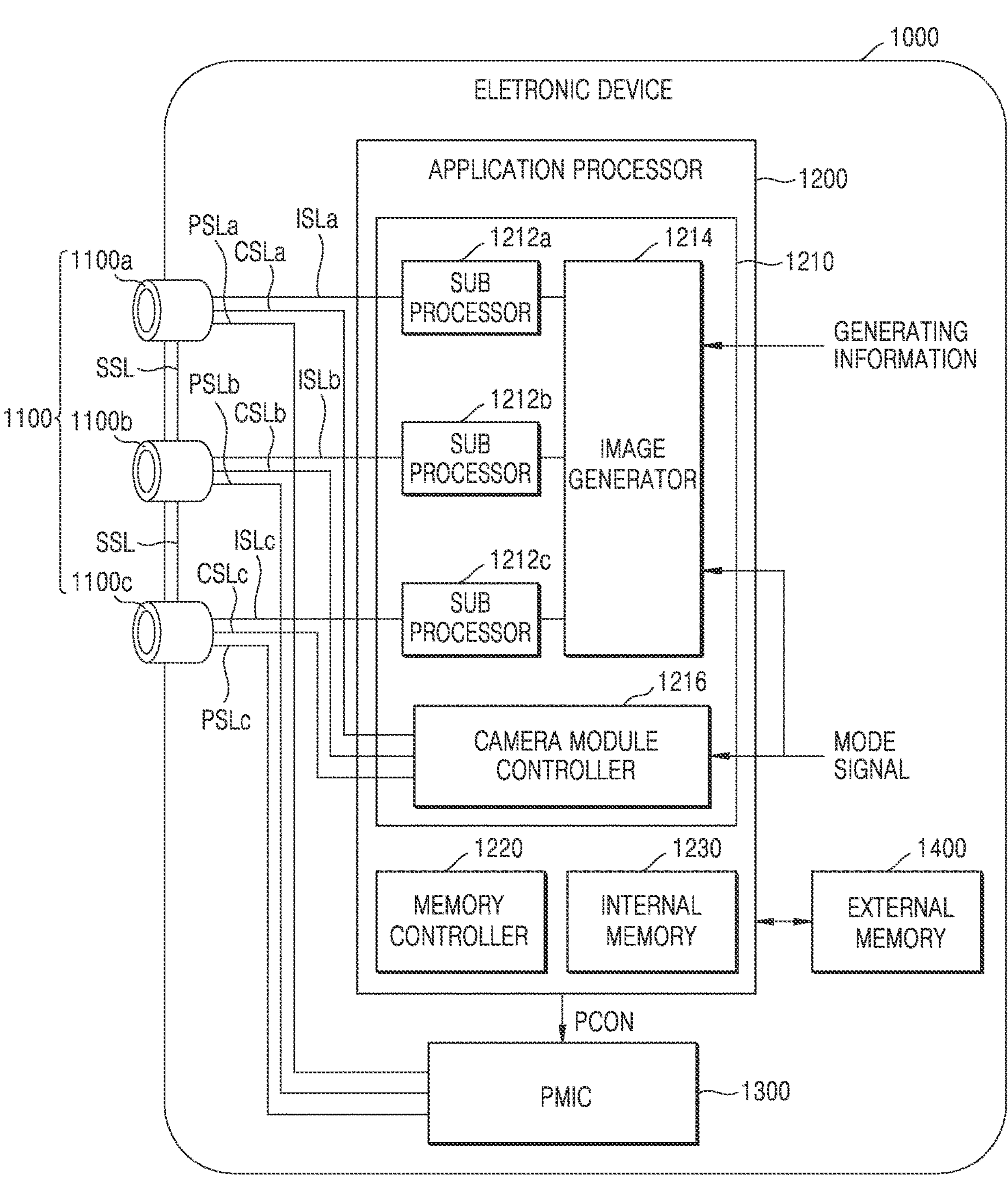
FIG. 11 is a block diagram of an electronic device including a multi-camera module, according to an embodiment.

FIG. 11 is a block diagram of an electronic device including a multi-camera module, according to an embodiment.

Referring to FIG. 11, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. Although FIG. 11 shows an embodiment in which three camera modules 1100*a*, 1100*b*, and 1100*c* are arranged, embodiments are not limited thereto. According to some embodiments, the camera module group 1100 may be modified to include only two camera modules or k camera modules (where k is a natural number equal to or greater than 4).

The image sensor module 100 described above with reference to FIGS. 1 to 10 may be applied to the camera module group 1100. In some embodiments, the camera module group 1100 may include an encoder, and the encoder may generate compressed data by compressing image data and transmit the compressed data to the application processor 1200. As described above, the encoder may include a statistic circuit and may change a setting value of the encoder based on restored data.

The application processor 1200 may include an image processing device 1210, a memory controller 1220, and an internal memory 1230. The application processor 1200 and the camera modules 1100*a*, 1100*b*, and 1100*c* may be implemented separately from each other as separate semiconductor chips, for example.

The application processor 200 described above with reference to FIGS. 1 to 10 may be applied to the application processor 1200. The application processor 1200 may include a decoder including a statistic circuit and may change a setting value of the decoder based on restored data.

Since the encoder and decoder may include statistic circuits and change setting values based on restored data, time for transferring information may not be needed. Since the encoder and the decoder may be synchronized in real time based on restored data, visual errors may be resolved.

The image processing device 1210 may include a plurality of sub image processors 1212*a*, 1212*b*, and 1212*c*, an image generator 1214, and a camera module controller 1216.

The number of sub image processors (e.g., the sub image processors 1212*a*, 1212*b*, and 1212*c*) included in the image processing device 1210 may correspond to the number of a plurality of camera modules (e.g., the camera modules 1100*a*, 1100*b*, and 1100*c*).

Image data generated by the camera module 1100*a* may be provided to the sub image processor 1212*a* through the image signal line ISLa, image data generated by the camera module 1100*b* may be provided to the sub image processor 1212*b* through the image signal line ISLb, and image data generated by the camera module 1100*c* may be provided to the sub image processor 1212*c* through the image signal line ISLc. The transmission of image data may be performed by using a CSI based on the MIPI, but embodiments are not limited thereto.

The sub image processors 1212*a*, 1212*b*, and 1212*c* may each perform image processing like bad pixel correction, 3A adjustments (auto-focus correction, auto-white balance, auto-exposure), noise reduction, sharpening, gamma control, and remosaic on the image data provided from the camera modules 1100*a*, 1100*b*, and 1100*c*.

Any one of the camera modules 1100*a*, 1100*b*, and 1100*c* may be designated as a master camera (e.g., 1100*b*) according to image generation information or a mode signal including a zoom signal, and the remaining camera modules (e.g. 1100*a* and 1100*c*) may be designated as slave cameras. The designation information may be included in the control signal and may be provided to the corresponding camera modules 1100*a*, 1100*b*, and 1100*c* through the control signal lines CSLa, CSLb, and CSLc separated from one another.

According to some embodiments, the control signal provided to the camera modules 1100*a*, 1100*b*, and 1100*c* from the camera module controller 1216 may include a sync enable signal. For example, when the camera module 1100*b* is the master camera, and the camera module 1100*a* and the camera module 1100*c* are the slave cameras, the camera module controller 1216 may transmit the sync enable signal to the camera module 1100*b*. The camera module 1100*b* to which the sync enable signal is provided generates a sync signal based on the provided sync enable signal and provides the generated sync signal to the camera module 1100*a* and the camera module 1100*c* through a sync signal line SSL. The camera module 1100*b* and the camera modules 1100*a* and 1100*c* may be synchronized with the sync signal and transmit image data to the application processor 1200.

The application processor 1200 may store a received image signal, that is, the encoded image signal, in the internal memory 1230 provided therein or the external memory 1400 outside the application processor 1200, and, thereafter, the application processor 1200 may read the encoded image signal from the internal memory 1230 or the external memory 1400, decode the encoded image signal, and display image data generated based on a decoded image signal. For example, a corresponding sub image processor from among the sub image processors 1212*a*, 1212*b*, and 1212*c* of the image processing device 1210 may perform decoding and may also perform image processing on a decoded image signal.

The PMIC 1300 may supply power, e.g., a power voltage, to each of the camera modules 1100*a*, 1100*b*, and 1100*c*. For example, under control by the application processor 1200, the PMIC 1300 may supply first power to the camera module 1100*a* through a power signal line PSLa, supply second power to the camera module 1100*b* through a power signal line PSLb, and supply third power to the camera module 1100*c* through a power signal line PSLc.

Figure 12:
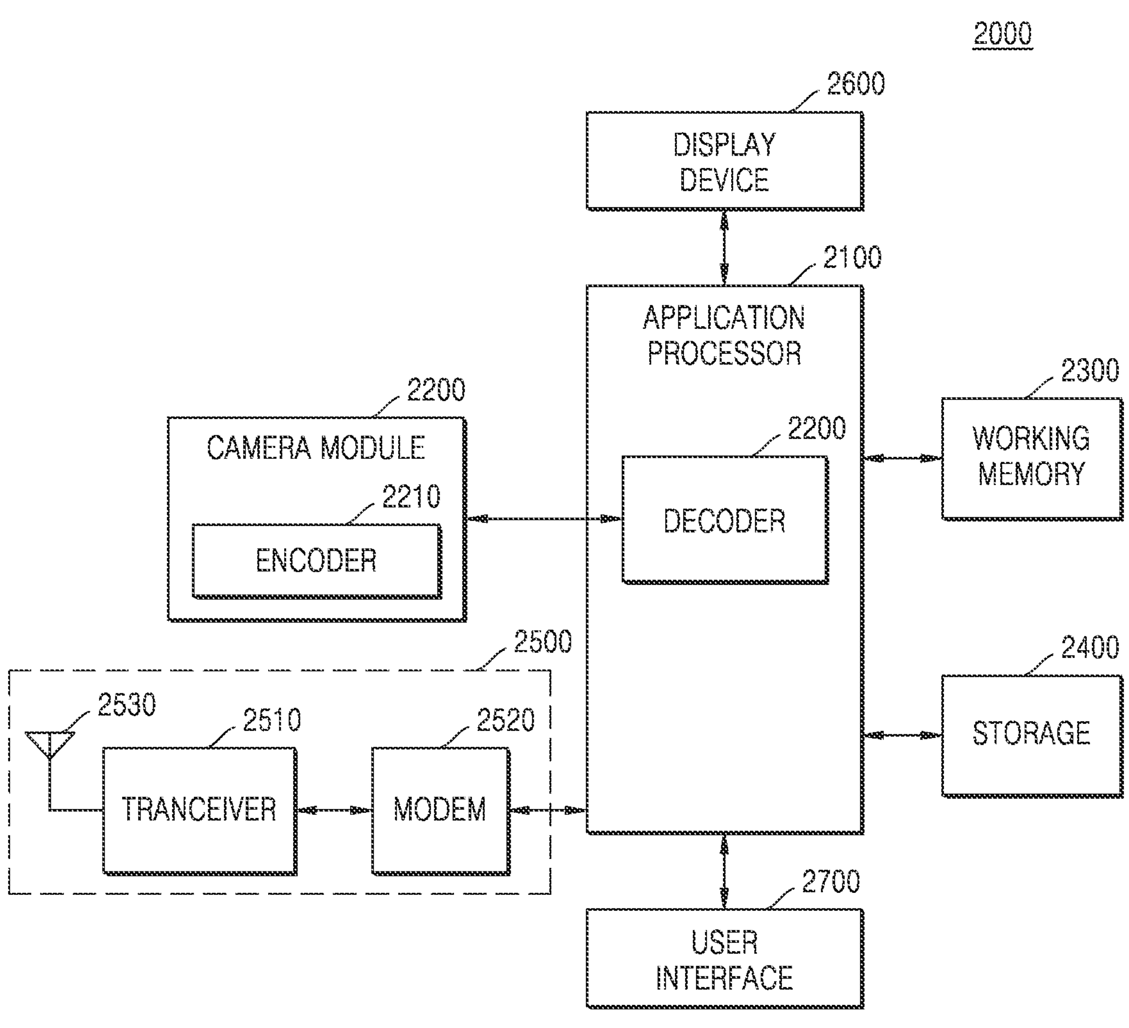
FIG. 12 is a block diagram schematically showing an electronic device according to an embodiment.

FIG. 12 is a block diagram schematically showing an electronic device according to an embodiment. The electronic device 2000 of FIG. 12 may be a portable terminal.

Referring to FIG. 12, the electronic device 2000 may include an application processor 2100, a camera module 2200, a working memory 2300, a storage 2400, a display device 2600, a user interface 2700, and a wireless transceiver 2500.

The application processor 2100 controls the overall operation of the electronic device 2000 and may be implemented as an SoC that drives an application program, an OS, etc. The application processor 2100 may provide image data provided from the camera module 2200 to the display device 2600 or store the image data in the storage 2400.

The image sensor module 100 described above with reference to FIGS. 1 to 10 may be applied to the camera module 2200. The camera module 2200 may include an encoder 2210, and the encoder 2210 may generate compressed data by compressing image data and transmit the compressed data to the application processor 2100. As described above, the encoder 2210 may include a statistic circuit and may change a setting value of the encoder 2210 based on restored data.

The application processor 2100 may include a decoder 2110 that decompresses compressed data by using a decoding scheme corresponding to a compression scheme of the encoder 2210, e.g., an encoding scheme. The decoder 2110 may decompress compressed data received from the camera module 2200 and generate reconstruction image data, and the application processor 2100 may image-process the reconstruction image data. The application processor 2100 may display the reconstruction image data or image-processed image data on the display device 2600 or may store the reconstruction image data or the image-processed image data in the storage 2400. As described above, the decoder 2110 may include a statistic circuit and may change a setting value of the decoder 2110 based on restored data.

Since the encoder 2210 and decoder 2110 may include statistic circuits and change setting values based on restored data, time for transferring setting change information may not be needed. Since the encoder 2210 and the decoder 2110 may be synchronized in real time based on restored data, visual errors may be resolved.

The working memory 2300 may be implemented by a volatile memory like DRAM or SRAM or a non-volatile resistive memory like a ferroelectric RAM (FeRAM), RRAM, or a phase-change RAM (PRAM). The working memory 2300 may store programs and/or data processed or executed by the application processor 2100.

The storage 2400 may be implemented with a non-volatile memory device like a NAND flash or a resistive memory. For example, the storage 2400 may be provided as a memory card (an MMC, an eMMC, an SD, a micro SD, etc.). The storage 2400 may store data received from the camera module 2200 or data processed or generated by the application processor 2100.

The user interface 2700 may be implemented with various devices capable of receiving user inputs, e.g., a keyboard, a curtain key panel, a touch panel, a fingerprint sensor, a microphone, etc. The user interface 2700 may receive a user input and provide a signal corresponding to the received user input to the application processor 2100.

The wireless transceiver 2500 may include a transceiver 2510, a modem 2520, and an antenna 2530.

While various embodiments have been particularly shown and described with reference to the drawings, it will be understood that various changes in form and details may be made therein without departing from the spirit and scope of the following claims.

What is claimed is:

1. An image processing device comprising:

an encoder configured to compress image data including pixel values of a pixel group in units of pixel groups to generate a bitstream and to decompress the bitstream to generate first restored data; and a decoder configured to receive the bitstream from the encoder and decompress the bitstream to generate second restored data, wherein the encoder comprises a first statistic circuit configured to generate first statistical data based on the first restored data and change a setting value of the encoder based on the first statistical data, wherein the decoder comprises a second statistic circuit configured to generate second statistical data based on the second restored data and change a setting value of the decoder based on the second statistical data, wherein the image sensor further comprises firmware configured to generate a first configuration parameter that corresponds to the setting value of the encoder by performing an arithmetic operation based on the first statistical data, wherein the encoder further comprises:

a first advanced peripheral bus (APB) interface configured to receive the first configuration parameter from the firmware and transmit the first configuration parameter to at least one encoder register of the encoder, a first parameter generation circuit configured to receive the first statistical data from the first statistic circuit and generate a second configuration parameter that corresponds to the setting value of the encoder by performing the arithmetic operation based on the first statistical data; and a first multiplexer configured to receive the first configuration parameter from the first APB interface and receive the second configuration parameter from the first parameter generation circuit, select one of the first configuration parameter and the second configuration parameter, and transmit one of the first configuration parameter and the second configuration parameter that is selected to the at least one encoder register, such that the at least one encoder register changes the setting value of the encoder to the one of the first configuration parameter and the second configuration parameter that is selected.

2. The image processing device of claim 1, wherein the first statistic circuit comprises:

a first reading circuit configured to generate first accumulated restored data by accumulating a plurality of pixel values of the first restored data;

a first calculation circuit comprising a first arithmetic operation circuit configured to generate the first statistical data by performing the arithmetic operation based on the first accumulated restored data; and a first buffer configured to store the first statistical data generated by the first calculation circuit.

3. The image processing device of claim 2, wherein the second statistic circuit comprises:

a second reading circuit configured to generate second accumulated restored data by accumulating a plurality of pixel values of the second restored data;

a second calculation circuit comprising a second arithmetic operation circuit configured to generate the second statistical data by performing the arithmetic operation based on the second accumulated restored data; and a second buffer configured to store the second statistical data generated by the second calculation circuit.

4. The image processing device of claim 2, wherein the first reading circuit comprises:

a storage circuit configured to store a plurality of pixel values of the first accumulated restored data; and an adding circuit configured to receive the plurality of pixel values of the first accumulated restored data from the storage circuit and perform an addition operation on the plurality of pixel values of the first accumulated restored data and the plurality of pixel values of the first restored data to generate the first accumulated restored data.

5. The image processing device of claim 2, wherein the encoder further comprises a memory that stores the first restored data, the first reading circuit comprises:

an accumulator configured to generate the first accumulated restored data; and a memory controller configured to generate a control signal to control the memory to output particular restored data from the first restored data stored in the memory, and the memory transmits the particular restored data to the accumulator of the first reading circuit based on the control signal.

6. The image processing device of claim 2, wherein the first statistical data comprises at least one of luminance information, direction information, or sensitivity information of the image data.

7. The image processing device of claim 2, wherein the first statistic circuit further comprises a calculation circuit controller configured to control a size of the first accumulated restored data received by the first arithmetic operation circuit.

8. The image processing device of claim 7, wherein the calculation circuit controller comprises:

a line counter configured to measure a number of lines of the first accumulated restored data and to control the size of the first accumulated restored data based on the number of lines; and a state circuit configured to control at least one of an operation start time or an operation end time of the first arithmetic operation circuit.

9. The image processing device of claim 1, wherein the at least one encoder register changes the setting value of the encoder to the one of the first configuration parameter and the second configuration parameter from the first multiplexer.

10. A method of operating an image processing device that synchronizes an encoder and a decoder each having a statistic circuit, the method comprising:

generating, by the statistic circuit in each of the encoder and the decoder, corresponding statistical data by performing a same arithmetic operation based on corresponding restored data; and simultaneously updating a setting value of the encoder and a setting value of the decoder based on the corresponding statistical data, wherein the generating by the statistic circuit in the encoder comprises:

generating, by firmware, a first configuration parameter that corresponds to the setting value of the encoder by performing the arithmetic operation based on the corresponding statistical data that corresponds to the encoder, receiving, by a first advanced peripheral bus (APB) interface, the first configuration parameter from the firmware and transmitting the first configuration parameter to at least one encoder register of the encoder, such that the at least one encoder register changes the setting value of the encoder to the first configuration parameter that corresponds to the setting value of the encoder, receiving, by a first parameter generation circuit in the encoder, the corresponding statistical data from the statistic circuit of the encoder and generating a second configuration parameter that corresponds to the setting value of the encoder by performing the arithmetic operation based on the corresponding statistical data that corresponds to the encoder; and receiving, by a multiplexer of the encoder, the first configuration parameter from the first APB interface and receiving the second configuration parameter from the first parameter generation circuit, selecting one of the first configuration parameter and the second configuration parameter, and transmitting one of the first configuration parameter and the second configuration parameter that is selected to the at least one encoder register.

11. The method of claim 10, wherein the generating comprises, by the statistic circuit of each of the encoder and the decoder:

generating corresponding accumulated restored data by accumulating the corresponding restored data; and generating the corresponding statistical data by performing the same arithmetic operation on the corresponding accumulated restored data.

12. The method of claim 11, wherein the generating of the corresponding statistical data by performing the same arithmetic operation on the corresponding accumulated restored data comprises:

measuring a number of lines of the corresponding accumulated restored data;

determining a size of the corresponding accumulated restored data based on the number of lines; and generating the corresponding statistical data by performing the same arithmetic operation based on the size of the corresponding accumulated restored data.

13. An electronic device comprising:

an image sensor comprising a pixel array, the image sensor configured to output image data;

an image signal processor comprising an encoder configured to compress the image data to generate a bitstream and to decompress the bitstream to generate first restored data;

wherein the encoder comprises:

a first statistic circuit configured to generate first statistical data by performing an arithmetic operation based on the first restored data; and a first parameter generation circuit configured to generate a first configuration parameter that corresponds to a setting value of the encoder by performing the arithmetic operation based on the first statistical data, and wherein the setting value of the encoder is changed based on the first configuration parameter, wherein the first statistic circuit comprises:

a first reading circuit configured to generate first accumulated restored data by accumulating a plurality of pixel values of the first restored data;

a first calculation circuit configured to generate the first statistical data by performing the arithmetic operation based on the first accumulated restored data; and a first buffer configured to store the first statistical data generated by the first calculation circuit, and wherein the electronic device further comprises firmware configured to generate a second configuration parameter corresponding to the setting value of the encoder, wherein the encoder further comprises a first multiplexer configured to transmit one of the first configuration parameter and the second configuration parameter to a register of the encoder, and the register of the encoder changes the setting value of the encoder according to the one of the first configuration parameter and the second configuration parameter.

14. The electronic device of claim 13, further comprising:

an application processor comprising a decoder configured to receive the bitstream from the encoder and decompress the bitstream to generate second restored data, wherein the decoder comprises:

a second statistic circuit configured to generate second statistical data by performing the arithmetic operation based on the second restored data; and a second parameter generation circuit configured to generate the second configuration parameter that corresponds to a setting value of the decoder by performing the arithmetic operation based on the second statistical data, and wherein the setting value of the decoder is changed based on the second configuration parameter.

15. The electronic device of claim 14, wherein the second statistic circuit comprises:

a second reading circuit configured to generate second accumulated restored data by accumulating a plurality of pixel values of the second restored data;

a second calculation circuit configured to generate the second statistical data by performing the arithmetic operation based on the second accumulated restored data; and a second buffer configured to store the second statistical data generated by the second calculation circuit.

* * * * *